(12) United States Patent
Keigley

(10) Patent No.: US 12,150,396 B1
(45) Date of Patent: Nov. 26, 2024

(54) REAR HITCH APPARATUSES, SYSTEMS, AND METHODS

(71) Applicant: ABI ATTACHMENTS, INC., Mishawaka, IN (US)

(72) Inventor: Kevin V. Keigley, Osceola, IN (US)

(73) Assignee: ABI Attachments, Inc., Mishawaka, IN (US)

( * ) Notice: Subject to any disclaimer, the term of this patent is extended or adjusted under 35 U.S.C. 154(b) by 559 days.

(21) Appl. No.: 17/461,000

(22) Filed: Aug. 30, 2021

Related U.S. Application Data

(60) Provisional application No. 63/072,466, filed on Aug. 31, 2020.

(51) Int. Cl.
| | |
|---|---|
| *A01B 59/042* | (2006.01) |
| *A01B 63/14* | (2006.01) |
| *B60D 1/02* | (2006.01) |
| *A01B 3/24* | (2006.01) |
| *A01B 49/02* | (2006.01) |
| *A01B 63/00* | (2006.01) |
| *A01B 63/32* | (2006.01) |

(52) U.S. Cl.
CPC .......... *A01B 59/042* (2013.01); *A01B 63/145* (2013.01); *B60D 1/025* (2013.01); *A01B 3/24* (2013.01); *A01B 49/02* (2013.01); *A01B 63/008* (2013.01); *A01B 63/32* (2013.01)

(58) Field of Classification Search
CPC ......... A01B 59/042; A01B 3/24; A01B 49/02; A01B 63/008; A01B 63/32; A01B 63/145; B60D 1/025
See application file for complete search history.

(56) References Cited

U.S. PATENT DOCUMENTS

| | | | |
|---|---|---|---|
| 2,827,307 A | 3/1958 | Osborn | |
| 2,968,494 A | 1/1961 | Klouda | |
| 3,204,984 A * | 9/1965 | Walberg | A01B 63/145 172/678 |
| 3,801,134 A | 4/1974 | Dees | |
| 3,843,160 A | 10/1974 | Frushour et al. | |
| 3,912,018 A * | 10/1975 | Brundage et al. | B60G 17/00 172/396 |
| 3,951,434 A | 4/1976 | Sause | |
| 4,042,253 A * | 8/1977 | Watts | A01B 63/145 172/224 |

(Continued)

*Primary Examiner* — Thomas B Will
*Assistant Examiner* — Joel F. Mitchell
(74) *Attorney, Agent, or Firm* — Taft Stettinius & Hollister LLP

(57) ABSTRACT

A hitch for coupling a ground working tool with a work machine comprises a first elongate member configured to couple with a work machine at a rearward location of the work machine, a second elongate member configured to couple with the ground working tool, and a play-added clevis joint coupling the first elongate member and the second elongate member. The play-added clevis joint comprises a clevis including a first clevis member having a first eye and a second clevis member having a second eye, a tang member including an oblong-shaped third eye, and a pin passing through the first eye, the second eye, and the third eye. The clevis and the tang member are rotatable relative to one another about a Z-axis of the pin. The clevis is tiltable relative to the tang member in a Y-Z plane extending along a centerline of the oblong-shaped third eye.

11 Claims, 15 Drawing Sheets

(56) References Cited

U.S. PATENT DOCUMENTS

| | | | | |
|---|---|---|---|---|
| 4,073,507 | A | * | 2/1978 | Dingess ................... B60D 1/02 |
| | | | | 280/487 |
| 4,248,450 | A | | 2/1981 | McWethy |
| 4,280,713 | A | | 7/1981 | Bruhn |
| 4,410,047 | A | * | 10/1983 | Arnold et al. ............ A01B 3/26 |
| | | | | 172/414 |
| D281,489 | S | | 11/1985 | Hancock |
| 4,875,527 | A | * | 10/1989 | Foley et al. ............ A01B 73/02 |
| | | | | 172/313 |
| 5,535,832 | A | * | 7/1996 | Benoit ................... A01B 49/02 |
| | | | | 172/197 |
| 5,722,678 | A | | 3/1998 | Hunger |
| 5,725,229 | A | | 3/1998 | McWethy |
| 5,839,744 | A | | 11/1998 | Marks |
| 7,347,440 | B2 | | 3/2008 | Shannon |
| 7,540,331 | B1 | * | 6/2009 | Keigley ................. A01B 73/00 |
| | | | | 172/195 |
| 7,673,894 | B2 | | 3/2010 | Bender |
| 7,784,813 | B2 | | 8/2010 | Columbia |
| 7,862,066 | B2 | | 1/2011 | Smith |
| 7,959,180 | B1 | | 6/2011 | Huston et al. |
| 8,128,116 | B1 | | 3/2012 | Huston et al. |
| 8,276,930 | B1 | | 10/2012 | Hesse et al. |
| 8,770,612 | B2 | | 7/2014 | Wendte et al. |
| 8,944,176 | B2 | * | 2/2015 | Kiser et al. ............ A01B 49/02 |
| | | | | 172/199 |
| 10,946,703 | B2 | | 3/2021 | Perotti |
| 2008/0073872 | A1 | | 3/2008 | Scott |
| 2010/0207357 | A1 | | 8/2010 | Hathcock et al. |
| 2013/0140793 | A1 | | 6/2013 | Terpsma et al. |
| 2014/0054877 | A1 | | 2/2014 | Adams, III |

\* cited by examiner

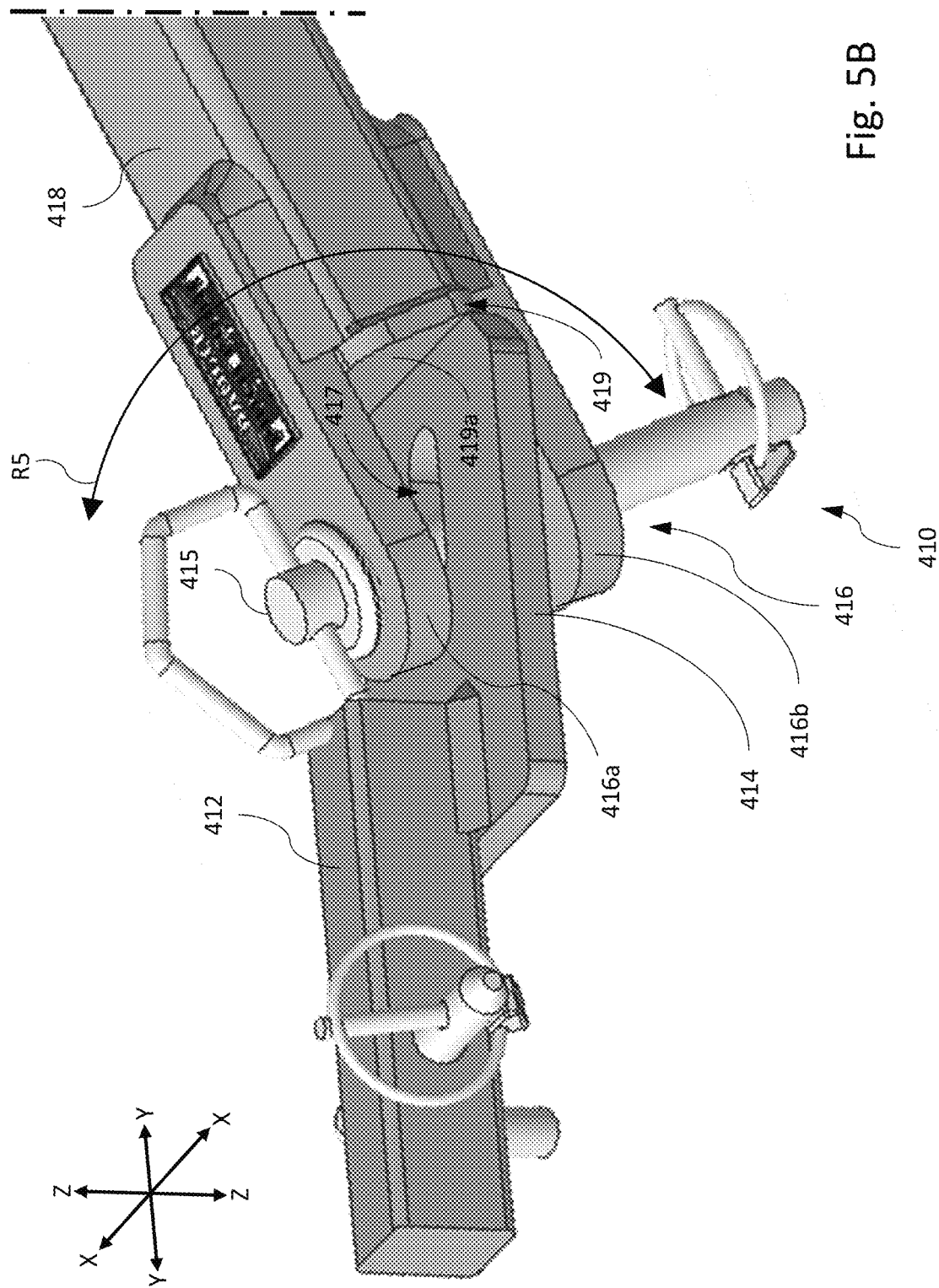

REAR HITCH APPARATUSES, SYSTEMS, AND METHODS

CROSS REFERENCE

The present application claims the benefit of and priority to U.S. Application No. 63/072,466 filed Aug. 31, 2020 the disclosure of which is hereby incorporated by reference.

BACKGROUND

The present disclosure relates generally to rear hitch apparatuses, systems, and methods for coupling ground working tools with work machines. A number of such hitches have been proposed, including hitches for ground working tools for grading, landscaping, and maintaining playing surfaces such as a baseball infield and warning track surfaces, equine arenas, and other athletic or sporting surfaces. Heretofore, such hitches have suffered from a number of drawbacks and disadvantages. There remains a substantial need for the unique apparatuses, systems, and methods disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY OF THE DISCLOSURE

One embodiment is a unique hitch for coupling a ground working tool and a work machine. Other embodiments, forms, objects, features, advantages, aspects, and benefits shall become apparent from the following description and drawings.

BRIEF DESCRIPTION OF THE FIGURES

FIG. 5B is a perspective view of a portion of the system of FIG. 1 in a second state of adjustment.

DETAILED DESCRIPTION OF EXAMPLE EMBODIMENTS

Figure 1:
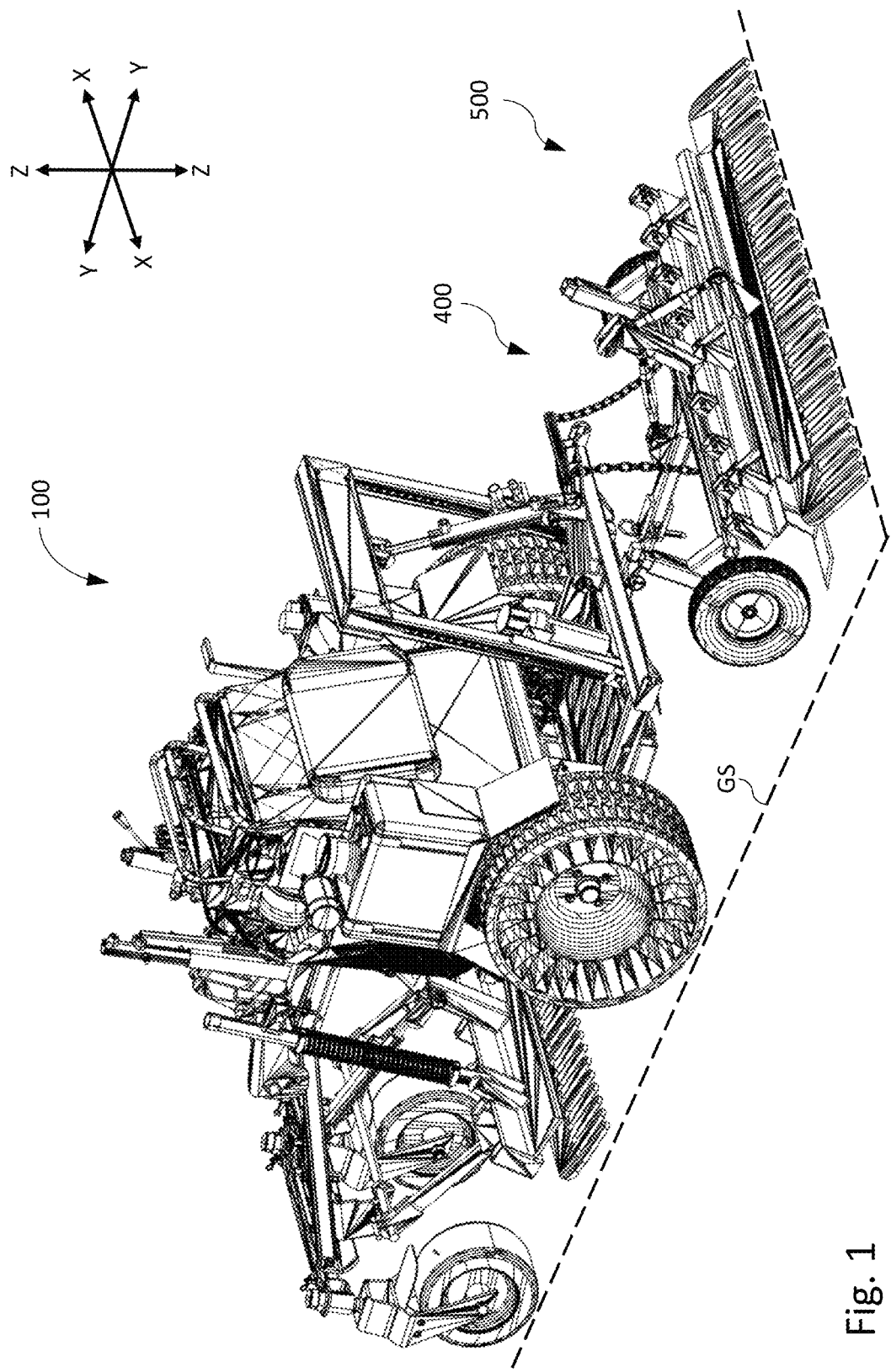
FIG. 1 is a perspective view illustrating certain aspects of an example system comprising a rear hitch coupled with a work machine and a ground working tool.
Figure 2:
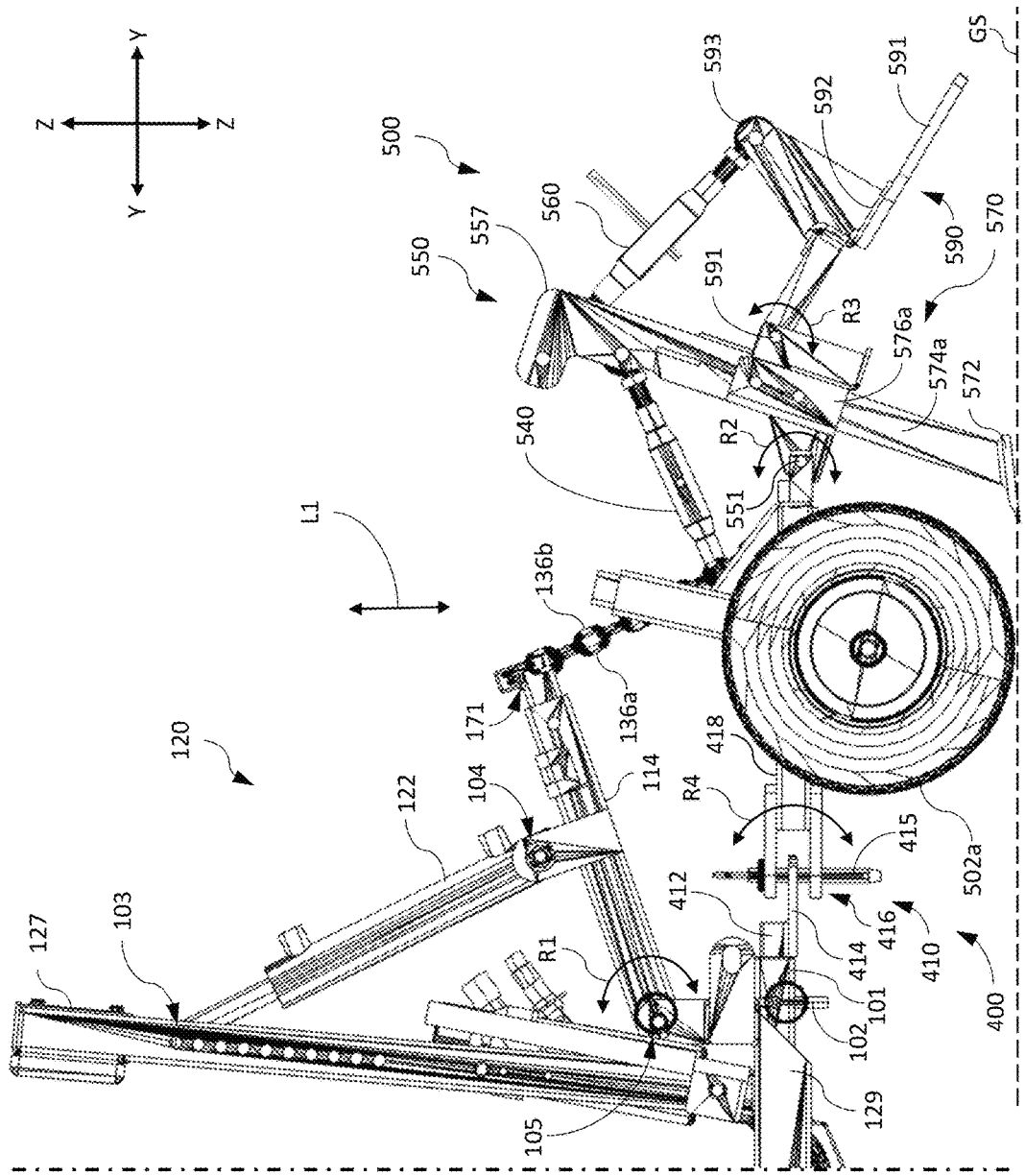
FIG. 2 is a side perspective view of a portion of the system of FIG. 1.
Figure 3:
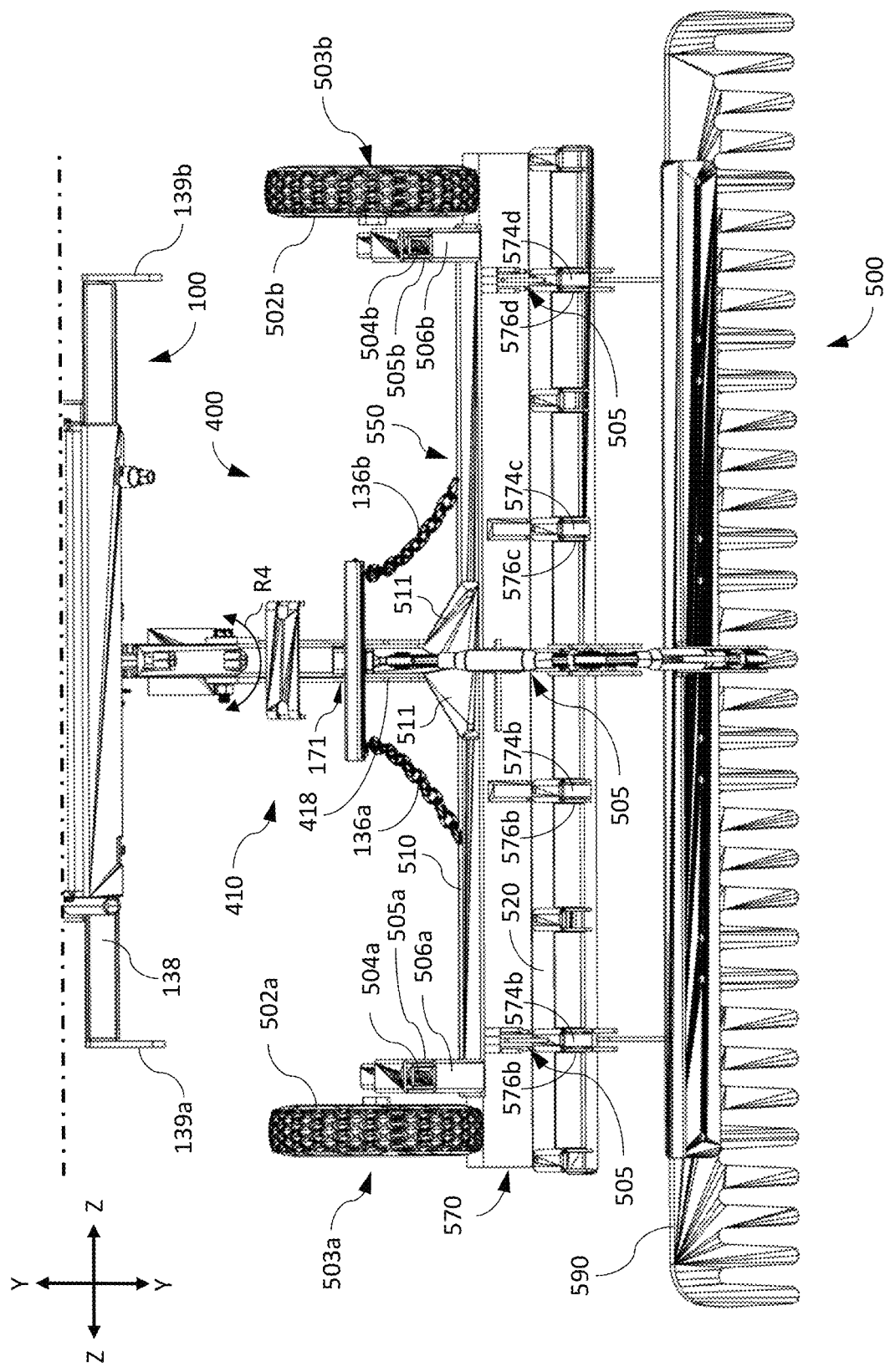
FIG. 3 is a top view of a portion of the system of FIG. 1.
Figure 4:
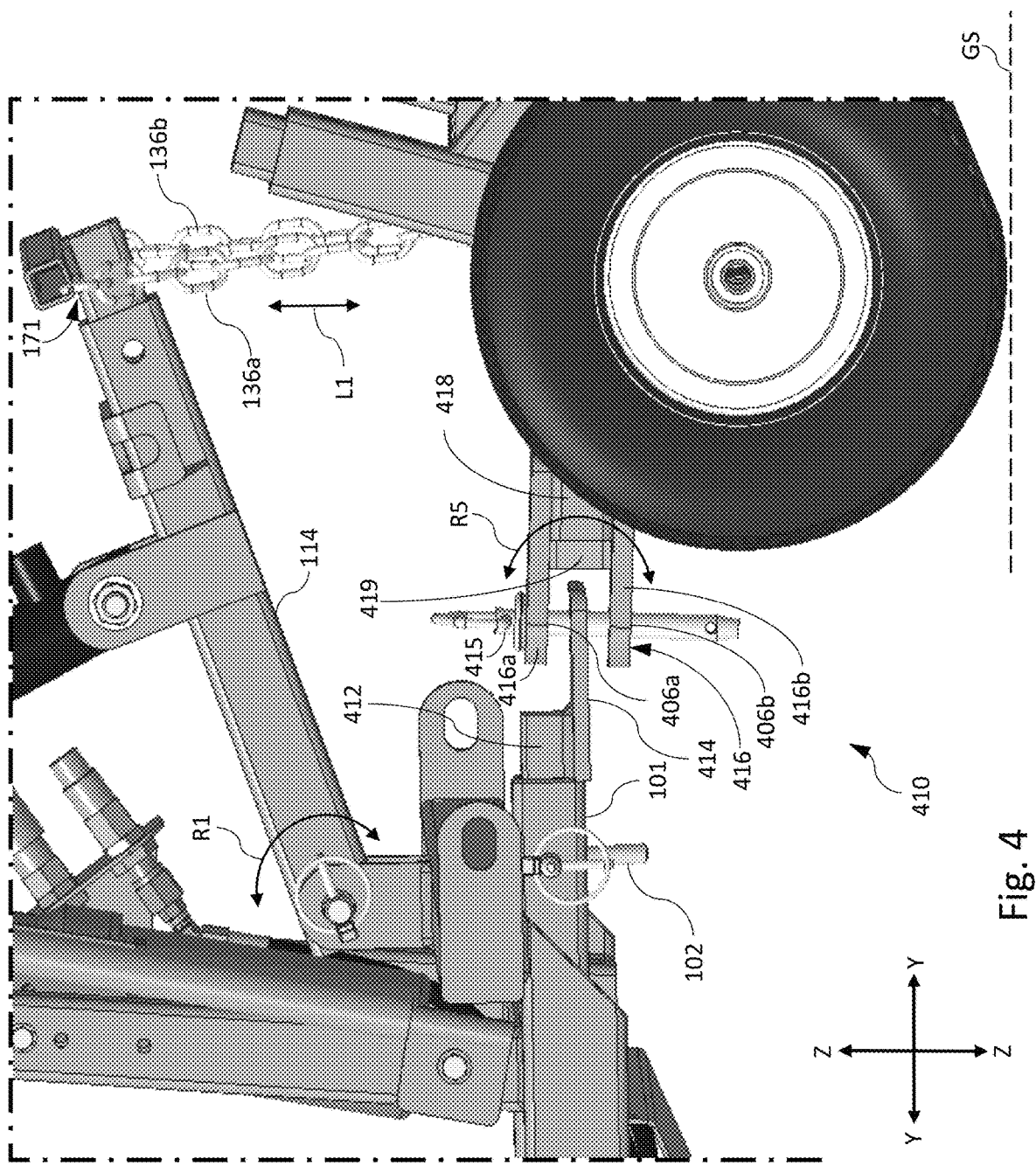
FIG. 4 is a side view of a portion of the system of FIG. 1.

Referring now to the figures and with initial reference to FIGS. 1-3, there is illustrated an example embodiment comprising a rear hitch system 400 coupling a work machine 100 with a ground working tool 500. The rear hitch system 400 may also be referred to herein as hitch 400 and the ground working tool 500 may be referred to herein as tool 500. It shall be appreciated that number of structural components or elements disclosed herein are described as being attached, coupled, or joined to one another or as attaching, coupling, or joining other structural components or elements which shall be understood to encompass a number of attachment, coupling, or joining structures and techniques, for example, adhesion, bolting, bonding, brazing, clamping, formation as an integral or unitary structure with coupled portions, screwing, riveting, welding or other attachment, coupling or joining techniques as will occur to one of skill in the art with the benefit of the present disclosure except as otherwise expressly or logically limited or excluded. The assemblies of components disclosed herein are likewise understood to encompass such attachment or coupling structures and techniques except as otherwise expressly or logically limited or excluded.

In the illustrated embodiment, the work machine 100 is a self-propelled, zero-turn radius work machine. In certain forms, the work machine 100 may be configured as a zero-turn radius work machine as described in U.S. Pat. Nos. 9,332,687 and 9,883,621 the disclosures of which are incorporated herein by reference. In other embodiments, various other types of work machines may be utilized, such as other types of zero-turn radius work machine, a riding lawnmower, a lawn tractor, and ATV or a variety of other types of work machines capable of towing a ground working tool.

The work machine 100 includes an actuator 120 comprising a hydraulic cylinder 122 which is coupled with a lifting member 114 at a joint 104 which permits rotation of the hydraulic cylinder 122 relative to the lifting member 114. Hydraulic cylinder 122 is also coupled with a vertically extending operator support member 127 of the work machine 100 at a joint 103 which permits rotation of the hydraulic cylinder 122 relative to the operator support member 127. The lifting member 114 is coupled with a frame member 129 of the work machine 100 at a joint 105 which permits rotation of the lifting member 114 relative to the frame member 129.

A connector bar 171 coupled with the lifting member 114. In the illustrated embodiment, the connector bar 171 is provided in an example T-bar configuration and includes a lateral bar member 172 which is coupled with flexible riggings 136a, 136b, and a longitudinal bar member 173 which is coupled with and extends longitudinally forward of the lateral bar member 172 and is received by and coupled with the lifting member 114. The first flexible rigging 136a is coupled with and extends between the connector bar 171 and the lateral frame member 510 of the tool 500. In the illustrated embodiment a second flexible rigging 136b is coupled with and extends between the connector bar 171 and the lateral frame member 510 of the tool 500. In other embodiments, a single flexible rigging may be utilized. In the illustrated embodiment, the flexible riggings 136a and 136b comprise lengths of chain. In other embodiments, the flexible riggings 136a and 136b may comprise cables, lines, ropes, wires, or other types of flexible riggings.

The connector bar 171 provides a single connection hookup for coupling the flexible riggings 136a, 136b with the lifting arm 114. Thus, the connector bar 171 permits a plurality of flexible riggings 136a, 136b to be coupled with the work machine 100 via a single connection and a single connecting pin simplifying connection and disconnection of the tool 500 with the work machine 100 as well as the connection and disconnection of other tools with the work machine 100. Furthermore, the connector bar 171 in combination with the hitch 400 provides a two-point hookup for coupling the tool 500 with the work machine 100 also simplifying the connection and disconnection of the tool 500 with the work machine 100 as well as the connection and disconnection of other tools with the work machine 100. The connector bar 171 also provides lateral spacing of the connection location of the flexible riggings 136a, 136b relative to the lifting arm 114. Such lateral spacing enhances lateral or side-to-side stability during lifting of the tool 500 and permits the length of flexible riggings 136a, 136b reducing the swing arc of the tool 500 during lifting. The lateral spacing of the connection location of the flexible riggings 136a, 136b relative to the lifting arm 114 and the lateral frame member 510, and the length of the flexible riggings 136a, 136b are preferably selected to provide rotation of the tool 500 about the Z-axis direction and centering of the tool 500 when raised. The rotation of the tool 500 about the Z-axis direction may be +/−40 degrees, +/−45 degrees or greater.

The actuator 120 is adjustable and actuatable by selectably supplying pressurized hydraulic fluid from hydraulic fluid lines (not illustrated) which are configured to supply pressurized hydraulic fluid to the actuator 120 to expand or contract the length of the hydraulic cylinder 122. Such adjustment of the actuator 120 causes the lifting member 114 to rotate about the joint 105 in the direction indicated by arrow R1. Starting with the lifting member 114 in a lowered position with the tool 500 in contact with an underlying ground surface GS, such rotation is first effective to reduce slack in the flexible riggings 136a and 136b and is second effective to raise the lifting member 114 and the hitch 400 above the underlying ground surface GS. Thus once the flexible riggings 136a and 136b become taut, upward rotation is effective further raise the lifting member 114 to cause a corresponding rotation and raising of portions of the hitch 400 and the tool 500 relative to an underlying ground surface GS and also relative to in the direction generally indicated by arrow L1.

The hitch 400 is detachably coupled with the work machine 100 by a first rigid elongate member 412 which is inserted into a hitch receiver 101 and by a pin 102 which passes through apertures formed in the receiver 101 and the first rigid elongate member 412 to maintain the receiver 101 and the first rigid elongate member 412 in a fixed relationship when coupled but also to permit in-field detachment or decoupling of the receiver 101 and the first rigid elongate member 412 without requiring the use of tools. In the illustrated embodiment, the first rigid elongate member 412 is configured as a hitch shank structured and sized to be inserted into the hitch receiver 101. The first rigid elongate member 412 is one example of a hitch component configured to couple with a work machine at a rearward location of the work machine. Other embodiments comprise other hitch components configured to couple with a work machine at a location rearward location of a work machine, for example, a location rearward of one or more rear ground contacting members of the work machine. For example, such other embodiments may comprise bolt-on components, latching components, and other types of fasteners, mating components, or coupling components as will occur to one of skill in the art with the benefit of the present disclosure. In the illustrated embodiment and certain forms of such other embodiments, the first rigid elongate member 412 is configured to detachably and fixedly couple with the work machine 100 in a tow-behind configuration.

The hitch 400 includes a second rigid elongate member 418 which is coupled with the tool 500. In the illustrated embodiment, the second rigid elongate member 418 is welded to the lateral frame member 510 of the tool 500, and gussets 511 are welded to the second rigid elongate member 418 and the lateral frame member 510. In other embodiments, the second rigid elongate 418 member may be differently welded to the tool 500, bolted to the tool 500, or coupled with the tool 500 using a number of additional or alternative types of fasteners, mating components, or coupling components as will occur to one of skill in the art with the benefit of the present disclosure.

The hitch 400 includes a play-added clevis joint 410 which couples the first rigid elongate member 412 and the second rigid elongate member 418. The play-added clevis joint 410 includes a clevis 416, a tang member 414, and a pin 415 which couples the clevis 416 and the tang member 414 while providing multi-axial relative motion of the clevis 416 and the other components coupled therewith relative to the tang member 414 and the other components coupled therewith. In the illustrated embodiment, the clevis 416 is coupled with the second rigid elongate member 418, and the tang member 414 is coupled with the first rigid elongate member 412. In other embodiments, the clevis 416 may be coupled with the first rigid elongate member 412 and the tang member 414 may be coupled with the second rigid elongate member 418.

The clevis 416 includes a first clevis member 416a having a first eye or aperture 406a defined therein which receives the pin 415 and a second clevis member 416b having a second eye or aperture 406b defined therein which receives the pin 415. The tang member 414 includes an oblong-shaped third eye or aperture 417. The pin 415 passes through the first eye or aperture 416a, oblong-shaped third eye or aperture 417, and the second eye or aperture 416b. The clevis 416 and the tang member 414 are rotatable relative to one another about a Z-axis of the pin 415 as generally indicated by arrow R4. The clevis 416 and the pin 415 are tiltable relative to the tang member in a Y-Z plane extending along a centerline of the oblong-shaped third eye or aperture 417 as generally indicated by arrow R5.

Figure 5A:
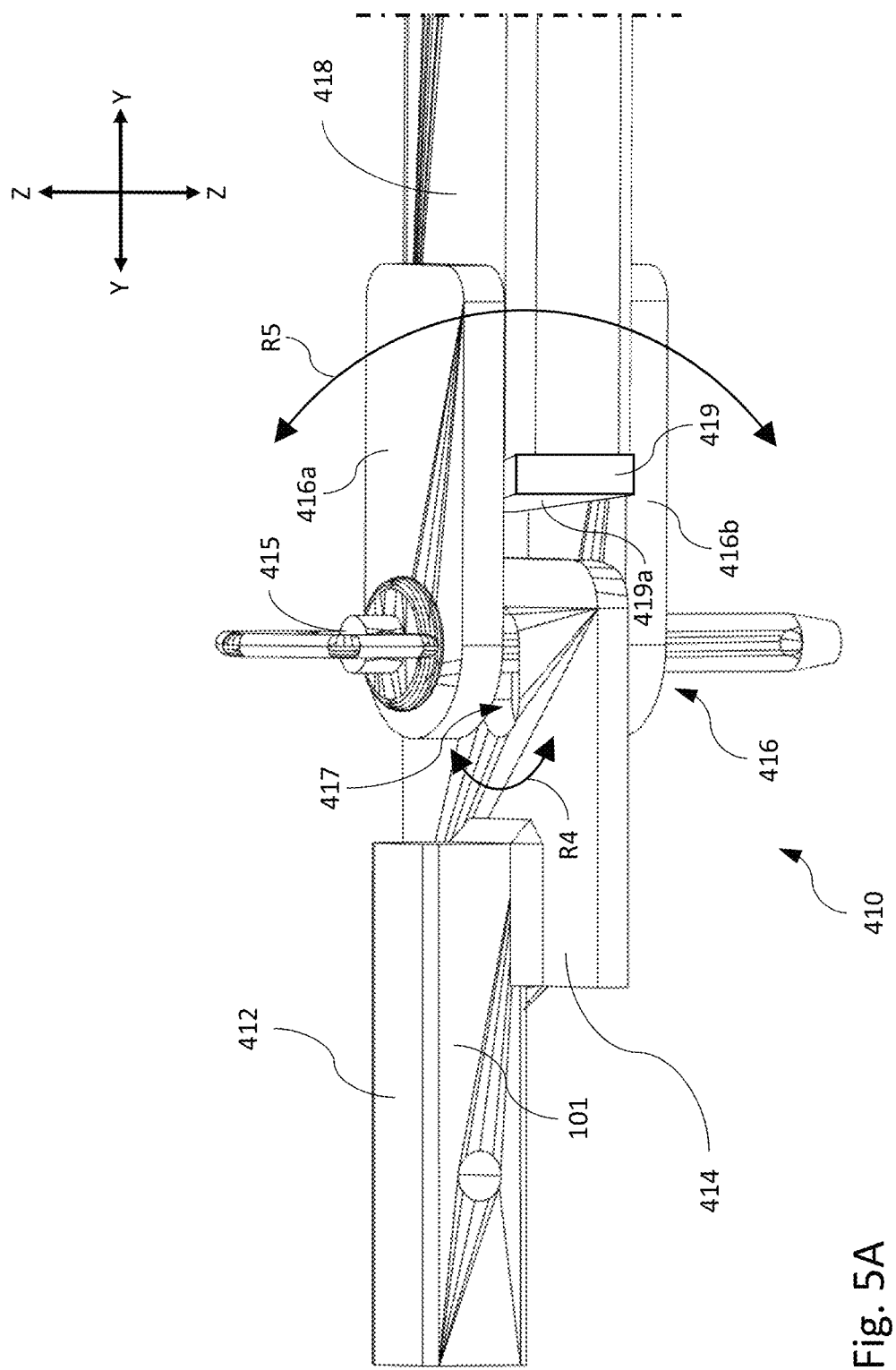
FIG. 5A is a perspective view of a portion of the system of FIG. 1 in a first state of adjustment.
Figure 6:
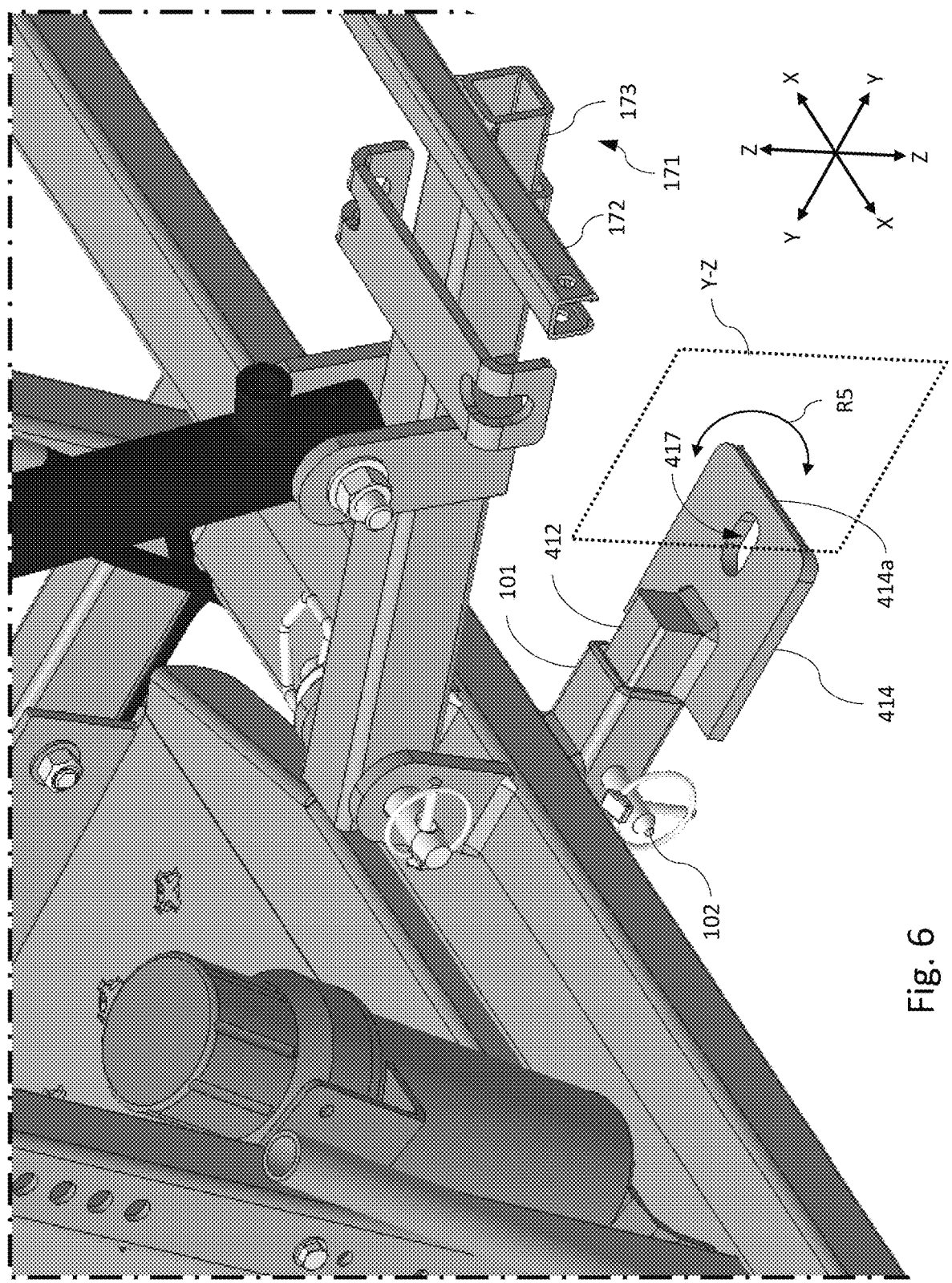
FIG. 6 is a perspective view of a portion of the system of FIG. 1.
Figure 7B:
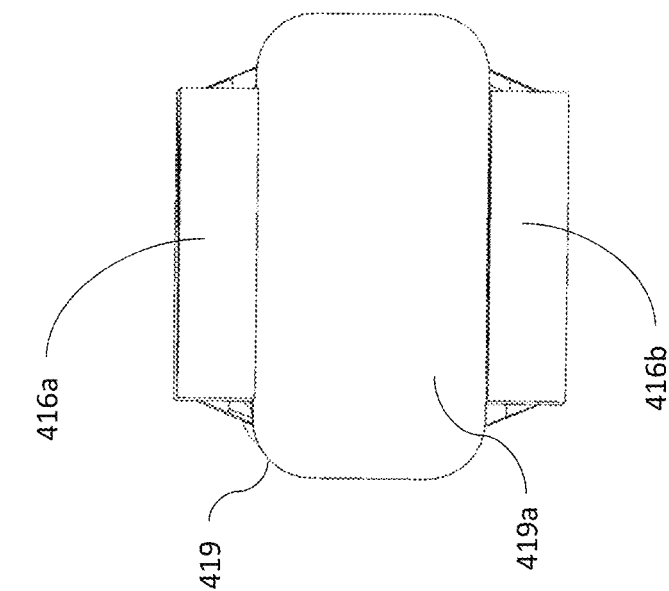
FIG. 7B is a perspective view of FIG. 7A.
Figure 7A:
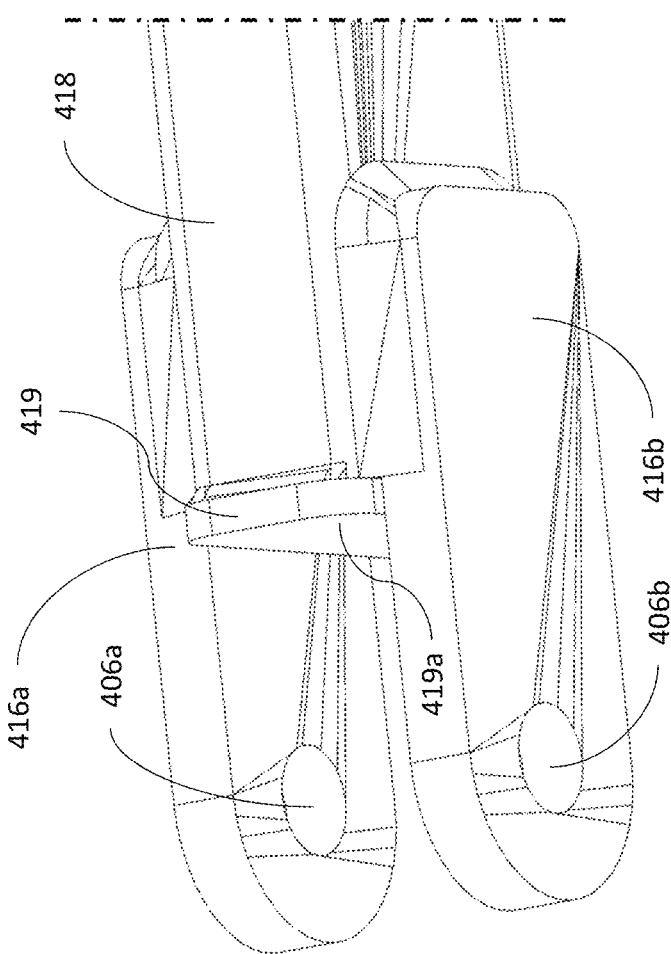
FIG. 7A is a perspective view of a portion of the system of FIG. 1.
Figure 8:
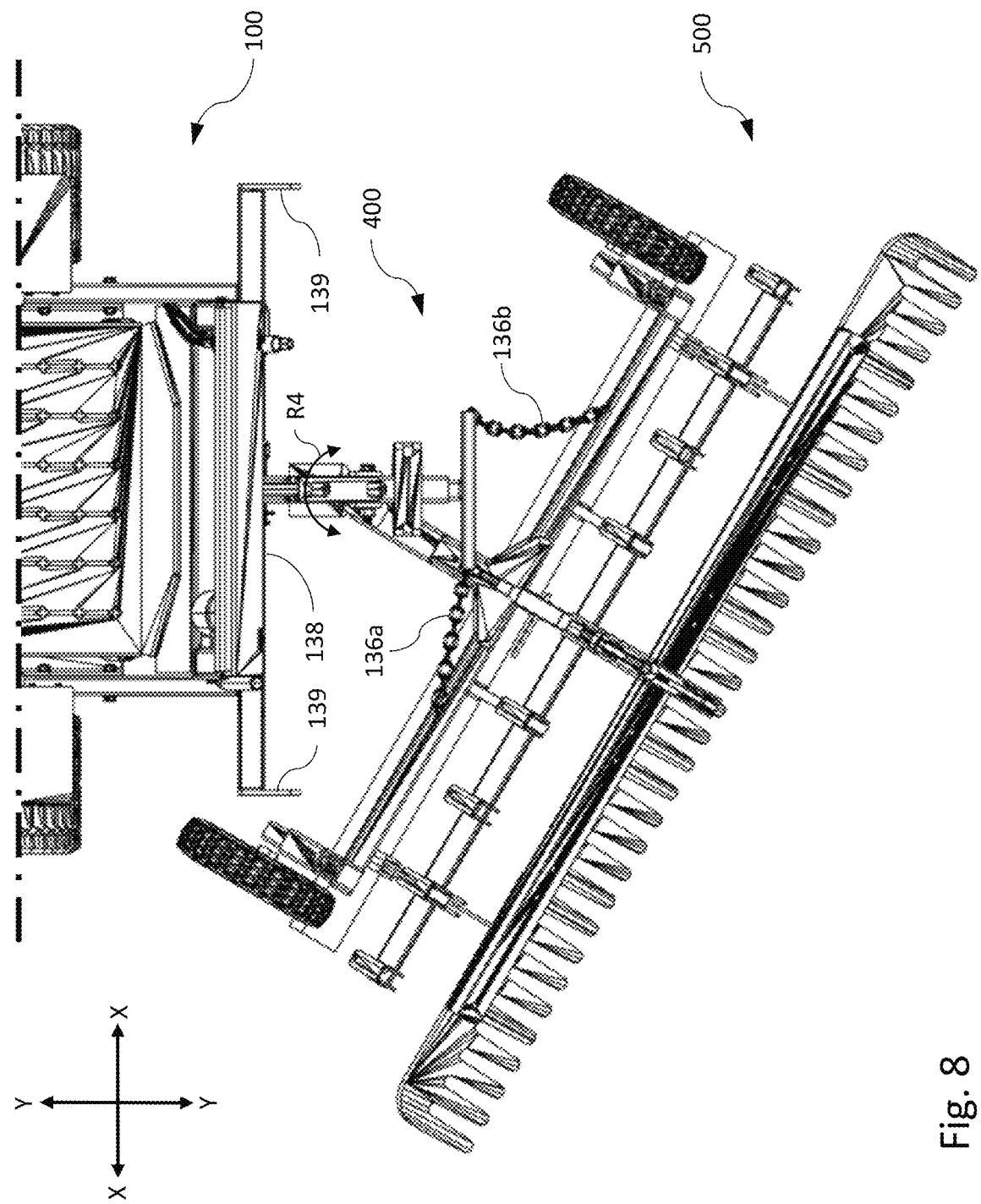
FIG. 8 is a perspective view of a portion of the system of FIG. 1 illustrating an example turning operation of the system.

The clevis 416 includes a seating member 419 positioned intermediate the first clevis member 416a and the second clevis member 416b. The seating member 419 has a substantially planar seating face 419a facing the tang member 414. The seating face 419a contacts the tang member 414 to align the first rigid elongate member 412 and the second rigid elongate member 418 when the clevis 416 is tilted relative to the tang member 414 in the illustrated Y-Z plane, for example, in the states of adjustment illustrated in FIG. 5B and FIG. 9B and force is applied to urge the seating member 419 against the tang member 414. Seating member 419 thereby provides stabilization over a range of rotation wherein the tang member 414 contacts the seating member 419. For example, when the clevis 416 is tilted relative to the tang member 414 by the second elongate member being raised relative to an underlying ground surface GS by lifting, the tang member 414 is squared with or forced into alignment with the seating member 419 which is effective to urge and maintain the tool 500 to a centered position.

When the clevis 416 is tilted relative to the tang member 414 by the second elongate member being raised relative to an underlying ground surface GS by lifting member 114 and flexible riggings 136a, 136b (e.g., from the position illustrated in FIG. 5A to the position illustrated in FIG. 5B or from the position illustrated in FIG. 9A to the position illustrated in FIG. 9B) the seating member 419 is forced against the tang member 414 at a predetermined orientation (generally parallel to the X-axis in the illustrated embodiment) by the weight of the raised tool 500 and the second rigid elongate member 418 is aligned in a predetermined relationship relative to the first rigid elongate member 412. In the illustrated embodiment, the geometry and orientation of the planar seating face 419a and the tang member 414 are configured to align the second rigid elongate member 418 and the first rigid elongate member 412 are aligned substantially parallel to the illustrated Y-Z plane. In other embodiments, the geometry and orientation of the planar seating face 419a and the tang member 414 are configured to align the second rigid elongate member 418 and the first rigid elongate member 412 in other orientations relative to one another and/or relative to the Y-X plane.

The tool 500 comprises a frame 505 comprising a lateral frame member 510, which is coupled with the second rigid elongate member 418 as described hereinabove, longitudinal members 505a, 505b, which are coupled with and extend forward from lateral frame member 510, and wheel assembly receiver members 505a, 505b, which are coupled with and extend vertically relative to longitudinal members 505a, 505b. Wheel assemblies 503a, 503b include wheels 502a, 502b and support members 504a, 504b. The wheels 502a, 502b are rotatably coupled with support members 504a, 504b. The support members 504a, 504b are slidably received in receiver members 505a, 505b and may be adjustably fixed at a plurality of positions relative to receiver members 505a, 505b by retention pins (not illustrated) which pass through aligned apertures provided in receiver members 505a, 505b, and support members 504a, 504b. Adjustment of the support members 504a, 504b to a plurality of positions relative to receiver members 505a, 505b may be performed to adjust the working position of the tool 500 in a lowered state and control the depth of penetration of ground engaging components of the tool 500.

It shall be appreciated that the support members 504a, 504b, the receiver members 505a, 505b, and the pins comprise examples of adjustment mechanisms coupled with a frame and a ground engaging member or adjustably coupling a ground engaging member with a frame. A number of other adjustment mechanisms are also contemplated, for example, adjustable linkages, sliding connections, hinged connections, piston and cylinder arrangements, other mechanisms as would occur to one of skill in the art with the benefit of the present disclosure, or combinations of the foregoing.

A number of additional and alternative frame and ground contacting member arrangements are contemplated in other embodiments. In some embodiments, the frame 505 includes additional or alternative structures arranged to rotatably couple first and second ground contacting members with the frame. In some embodiments the wheels 502a, 502b may be positioned in other spaced apart locations relative to the frame 505 or another frame. In some embodiments, other rotatable ground contacting members may be rotatably coupled with the frame 505 or another frame, for example, tweels, rollers, treads, tracks of other rotatable ground contacting members.

In the illustrated embodiment, the tool 500 comprises a ground engaging tool assembly 570 operatively coupled with a tool subframe assembly 550. The ground engaging tool assembly 570 includes a cleaving blade 572a coupled with supporting shanks 574a, 574b, 574c, 576d which, in turn, are received in and retained by respective receivers 576a, 576b, 576c, 576d. The receivers are, in turn, coupled with a lateral member 520 which is coupled with the frame 505 by a plurality of hinges 551 and rotatable relative to the frame 505 in the direction generally indicated by arrow R2. A top link 540 is coupled with and extends between the frame 505 and a post member 557 of the tool subframe assembly 550. The top link 540 is operator adjustable to vary its length effective to rotate the tool subframe assembly 550 and the ground engaging tool assembly 570 about an axis of the hinges 551 in the direction generally indicated by arrow R2.

It shall be appreciated that the ground engaging tool assembly 570 is one example of a ground engaging member comprising at least one shank member coupled with a frame by a tool subframe assembly. It shall also be appreciated that the ground engaging tool assembly 570 is one example of a surface penetrating member or a subsurface conditioning member. Other embodiments may additionally or alternatively include other types a surface penetrating member or a subsurface conditioning member or other types of ground engaging members comprising at least one shank member coupled with a frame by a tool subframe assembly, for example, scarifying shanks, rock pickers, rippers, or other types of ground engaging members as will occur to one of skill in the art with the benefit of the present disclosure. It shall be further appreciated that the top link 540 is one example of an adjustment mechanism that is adjustable to vary the pitch of the at least one shank member relative to the frame. Other embodiments contemplate other types of actuators, for example, hydraulic actuators, pneumatic actuators, motor-driven screw actuators, linear actuators or motors, or other types of actuators as will occur to one of skill in the art with the benefit of the present disclosure.

The tool 500 further comprises a second ground engaging tool assembly 590 including a rake 591 which is coupled with a lateral carrier member 592 and a post member 593 coupled with and extending from the lateral carrier member 592. The second ground engaging tool assembly 590 is adjustably coupled with the tool subframe assembly 550 by a second plurality of hinges 591 and is rotatable relative to the tool subframe assembly 550 in the direction generally indicated by arrow R3. A second top link 560 is coupled with and extends between the post member 593 of the second ground engaging tool assembly 590 and post member 557 of the tool subframe assembly 550 and is operator adjustable to vary its length effective to rotate the second ground engaging tool assembly 590 relative to the tool subframe assembly 550 about an axis of the hinges 591 in the direction generally indicated by arrow R3. The top link 540 and the second top link 560 are independently adjustable such that the angle or pitch of the tool subframe assembly 550 and the ground engaging tool assembly 570 relative to the frame 505 and the angle or pitch of second ground engaging tool assembly 590 relative to the tool subframe assembly 550 are independently adjustable.

It shall be appreciated that the second ground engaging tool assembly 590 is one example of a second ground engaging member. It shall be further appreciated that the second ground engaging tool assembly 590 is one example of a second ground engaging member in the form of a surface conditioning tool. Other embodiments may additionally or alternatively include other types of surface conditioning tools or other ground engaging members, for example, brooms, brushes, nail drags, flexible drag mats such as cocoa mats or other grooming drag tools, chain drags, chain harrows, equine drags, bunker rakes, segmented cone drags, or other types of ground engaging members as will occur to one of skill in the art with the benefit of the present disclosure. It shall be further appreciated that the top link 560 is one example of an adjustment mechanism that is adjustable to vary the pitch of the second ground engaging tool assembly. Other embodiments contemplate other types of actuators, for example, hydraulic actuators, pneumatic actuators, motor-driven screw actuators, linear actuators or motors, or other types of actuators as will occur to one of skill in the art with the benefit of the present disclosure.

The coupled combination of the hitch 400, the work machine 100, and the tool 500 is adjustable over a number of ranges into a number of positions or configurations. Such adjustment may include active adjustment, passive adjustment, and combined active/passive adjustment. In the illustrated embodiment, active adjustment may be accomplished by operating actuator 120 to raise and lower lifting member 114 and passive adjustment may be accomplished in response to the turning of the work machine 100.

In the state of adjustment illustrated, for example, in FIGS. 1-4 and 7, the actuator 120 is controlled to position the lifting member 114 such that the tool 500 contacts the underlying ground surface GS. The lifting member 114 may be controlled over a range of positions in which the tool 500 contacts the underlying ground surface GS. For example, in the state of adjustment illustrated most clearly in FIG. 3, the flexible riggings 136a, 136b are provided with a first amount of slack as indicated, for example, by the curvature of the flexible riggings 136a, 136b. In the state of adjustment illustrated in FIG. 3, the first amount of slack is a near-minimal amount of slack (i.e., the flexible riggings 136a, 136b are nearly taut) permitting a first range of rotation of the tool 500 and the second rigid elongate member 418 relative to the first rigid elongate member 412 and the work machine 100 about the axis of the pin 415 (which is oriented generally in the Z-axis direction in the illustrated embodiment) in the direction generally indicated by arrow R4. Accordingly, the first range of motion is a near-minimal amount of rotation (i.e., the rotation of the tool 500 and the second rigid elongate member 418 relative to the first rigid elongate member 412 and the work machine 100 is near zero, e.g., less than +/−5 degrees from center).

The presence of slack in the flexible riggings 136a, 136b allows rotation of the tool 500 and the second rigid elongate member 418 up to a degree of rotation where at least one of the flexible riggings 136a, 136b becomes taut thereby limiting further rotation. As the amount of slack in the flexible riggings 136a, 136b may be varied, so may the range or degree of rotation of the tool 500 and the second rigid elongate member 418 be varied to a corresponding degree. Accordingly, the amount of slack present in the flexible riggings 136a, 136b may be increased to permit a greater range of rotation of the tool 500 and the second rigid elongate member 418 or may be decreased to permit a lesser range of rotation of the tool 500 and the second rigid elongate member 418 although the length of the flexible riggings 136a, 136b is preferably selected to limit the rotation of the tool 500 so that it does not come into contact with the work machine 100.

From the state of adjustment illustrated, for example, in FIGS. 1-3 and 9A, the actuator 120 may be controlled to lower lifting member 114 to lower position wherein the amount of slack in flexible riggings 136a, 136b is increased allowing increased rotation effective to take-up the increased slack. The increased degree of rotation may be constrained when at least one of the flexible riggings 136a, 136b becomes taut thereby limiting further rotation. In one such state of adjustment, the lifting member 114 is adjustable to a lowermost position wherein the ground working tool 500 contacts the underlying ground surface GS and the flexible riggings 136a, 136b are provided with an amount of slack effective to permit a maximum range of rotation of the tool 500. In certain forms, the maximum range of rotation may permit rotation of preferably of at least plus or minus 35 degrees, more preferably of at least plus or minus 40 degrees, or even more preferably at least plus or minus 45 degrees. In certain forms, the maximum range of rotation permits the tool 500 to work a portion of underlying ground surface GS about a centrally positioned circle with a radius of 1 foot or less. Such rotation may occur passively in response to turning of the work machine 100.

Figure 9A:
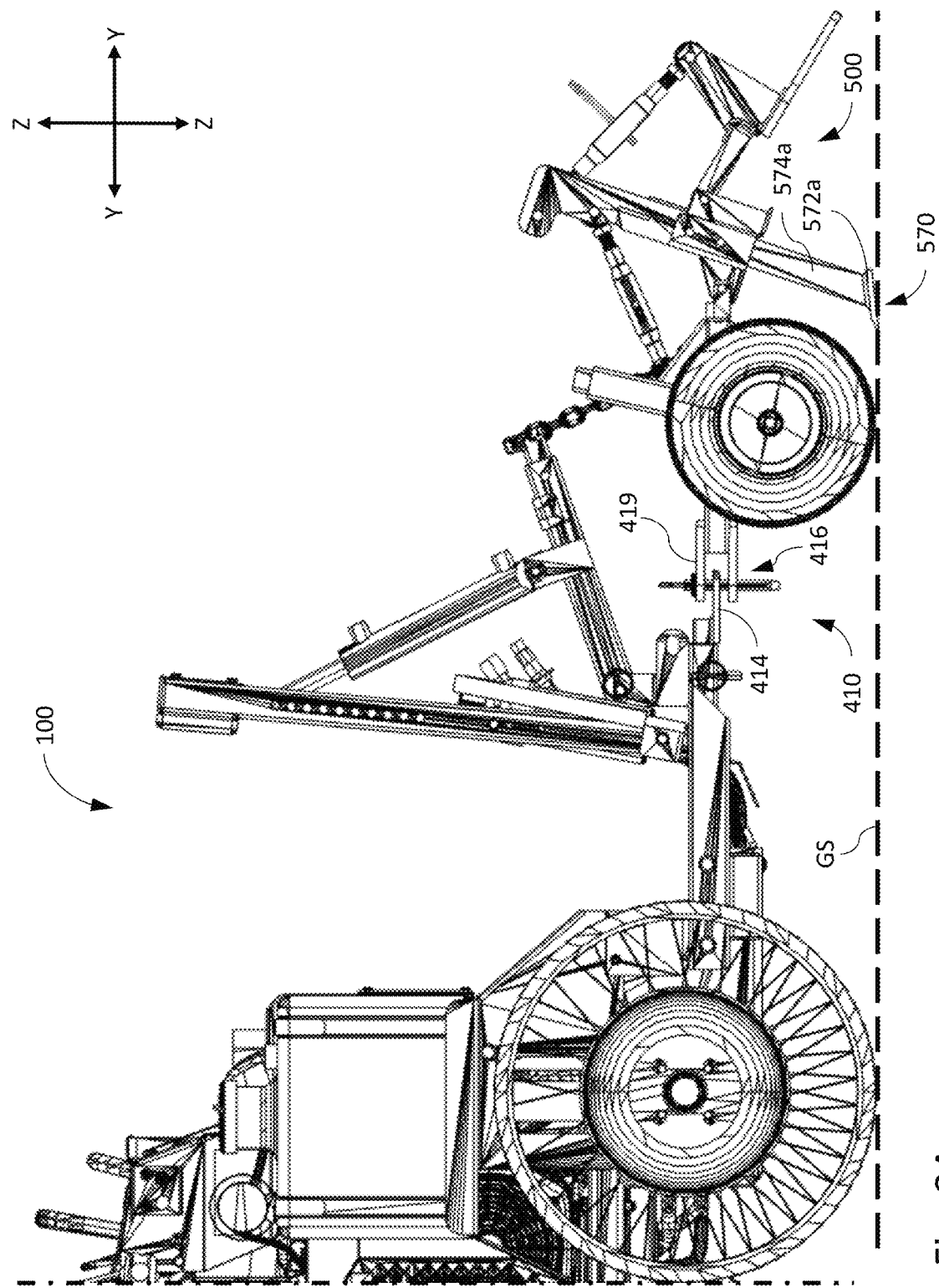
FIG. 9A is a side view of a portion of the system of FIG. 1 in a first state of an adjustment.
Figure 9B:
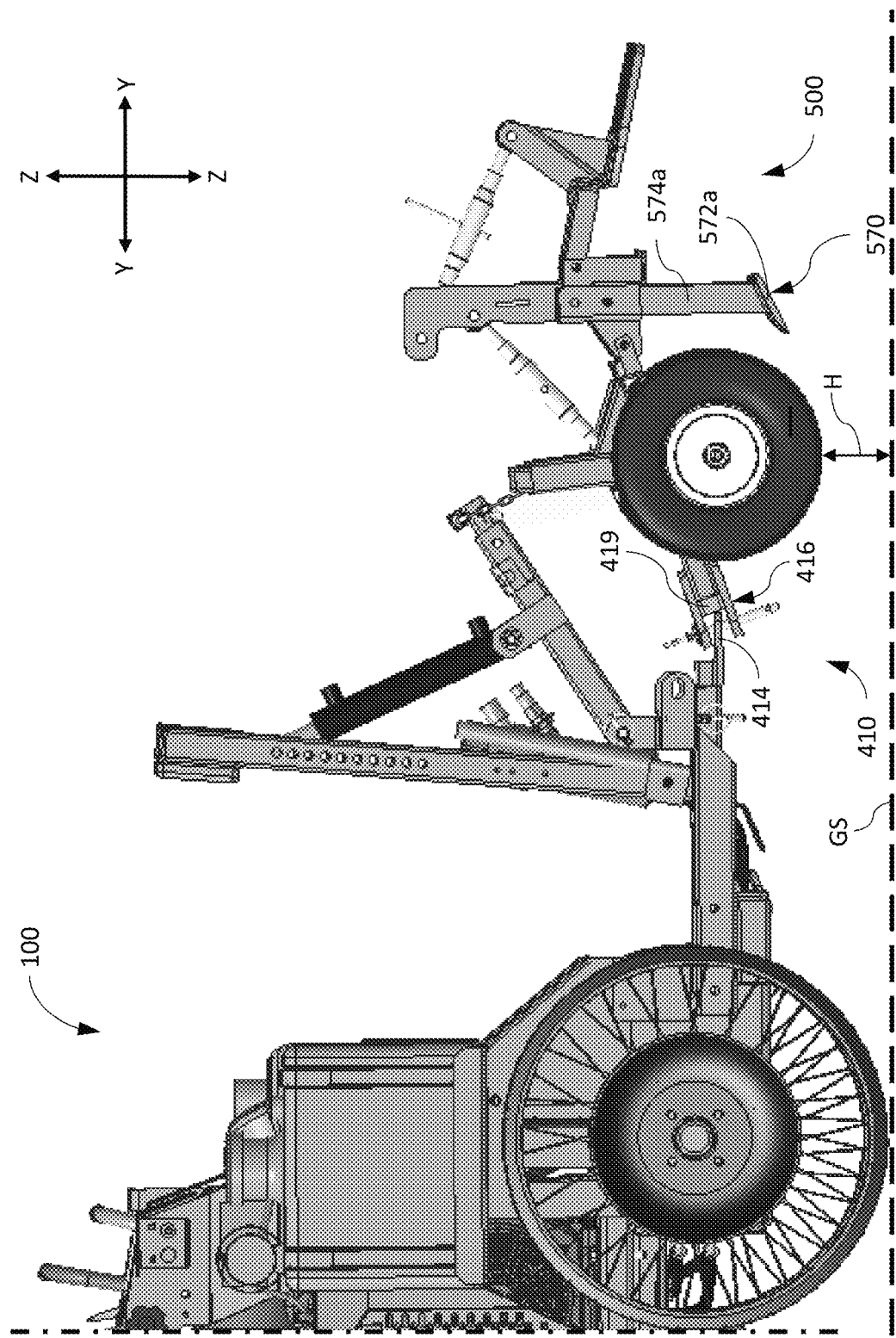
FIG. 9B is a side view of a portion of the system of FIG. 1 in a first state of an adjustment.

From the state of adjustment illustrated, for example, in FIGS. 1-3 and 9A, the actuator 120 may be also controlled to raise the lifting member 114 to position wherein the ground working tool 500 is raised above an underlying ground surface GS and supported at least in part by the flexible riggings 136a, 136b, for example, as illustrated in FIG. 9B. In this state of adjustment, the flexible riggings 136a 136b are taut effective to prevent or limit rotation of the tool 500. This configuration may be maintained over a range of motion from a maximally raised position of lifting member 114 down to and including to a position where surface condition tool 500 comes into contact with the underlying ground surface GS with flexible riggings 136a 136b being taut. Additionally, if surface condition tool 500 is raised from an angled position, the act of raising these components is effective to return them to a substantially straight or non-angled position.

It shall be appreciated that the lifting member 114 is adjustable to a first example position wherein the ground working tool 500 is raised above the underlying ground surface GS and supported at least in part by the flexible riggings 136a, 136b. Furthermore, the lifting member 114 is adjustable to a second example position lower than the first example position wherein the ground working tool 500 contacts the underlying ground surface GS and the flexible riggings 136a, 136b are taut effective to prevent or limit rotation of the tool 500. Additionally, the lifting member 114 is adjustable to a third example position lower than the second example position wherein the ground working tool 500 contacts the underlying ground surface GS and the flexible riggings 136a, 136b are provided with a first amount of slack effective to permit a first range of rotation of the tool 500. In addition, the lifting member 114 is adjustable to a fourth example position lower than the third example position wherein the ground working tool 500 contacts the underlying ground surface GS and the flexible riggings 136a, 136b are provided with a second amount of slack effective to permit a second range of rotation of the tool 500, the second range of rotation being greater than the first range of rotation.

It shall also be appreciated that, when the ground working tool is in contact with the underlying ground surface GS, the lifting member 114 is adjustable over a first range of motion wherein the range of rotation of the tool 500 is varied in response to variation in the amount of slack present in the flexible riggings 136a, 136b. Additionally, the lifting member 114 is adjustable over a second range of motion wherein the flexible riggings 136a, 136b are taut effective to prevent or limit rotation of the tool 500. This range includes positions wherein the ground working tool 500 is raised above the underlying ground surface GS as well as positions wherein the ground working tool 500 contacts the underlying ground surface GS.

It shall be appreciated that the longitudinal length of the offset between the work machine 100 and the ground working tool 500, the lateral width of the ground working tool 500, and the degree of side-to-side articulation or angular rotation may be selected to provide an increase in useable turning radius of the combination of the work machine 100 and the tool 500. For example, the longitudinal length of the offset between the work machine 100 and the ground working tool 500 may be selected to provide sufficient clearance between the work machine and the ground working tool for a predetermined turning radius. The width of the ground working tool 500 and the degree of side-to-side articulation or sway may then be selected to ensure that the ground working tool 500 travels over and covers the tracks left by the work machine 100.

FIG. 9A illustrates the lifting member 114 rotated to a position in which the tool 500 is lowered to contact the underlying ground surface GS and rotated about axis A2 to a degree permitted by taking up slack in the flexible riggings 136a, 136b. The amount of slack in flexible riggings 136a, 136b permits rotation of hitch 200, and the tool 500 about axis A2. The hitch 200 and the tool 500 may be rotated during turning operation of the operation of work machine 100 over range including a plurality of lowered turned positions.

FIG. 9B illustrates the lifting member 114 rotated to a position in which the tool 500 is raised above the underlying ground surface GS by a distance H and supported in this position by flexible riggings 136a, 136b which are maintained in a taut state. The tool 500 may be raised and lowered between the position illustrated in FIG. 9A and the position illustrated in FIG. 9B by adjustment of the actuator 120 to raise and lower the lifting member 114. Starting with the hitch 200 and the tool 500 in a lowered, turned position (e.g., the position illustrated in FIG. 9A) lifting member 114 may be rotated to raise the tool 500 to the position illustrated in FIG. 9B. During the raising operation, as slack is taken up by flexible riggings 136a, 136b, the tool 500 is moved from the turned position to a centered position and is urged toward the centered position when the tool 500 is raised. During the raising operation, the seating face 419a contacts the tang member 414 to align the second rigid elongate member 418 with the first rigid elongate member 412 and urge and maintain the tool 500 to a centered position. The weight of the tool 500, applies force to the seating member 419 urging it into a predetermined relationship with the tang member 414.

Figure 10A:
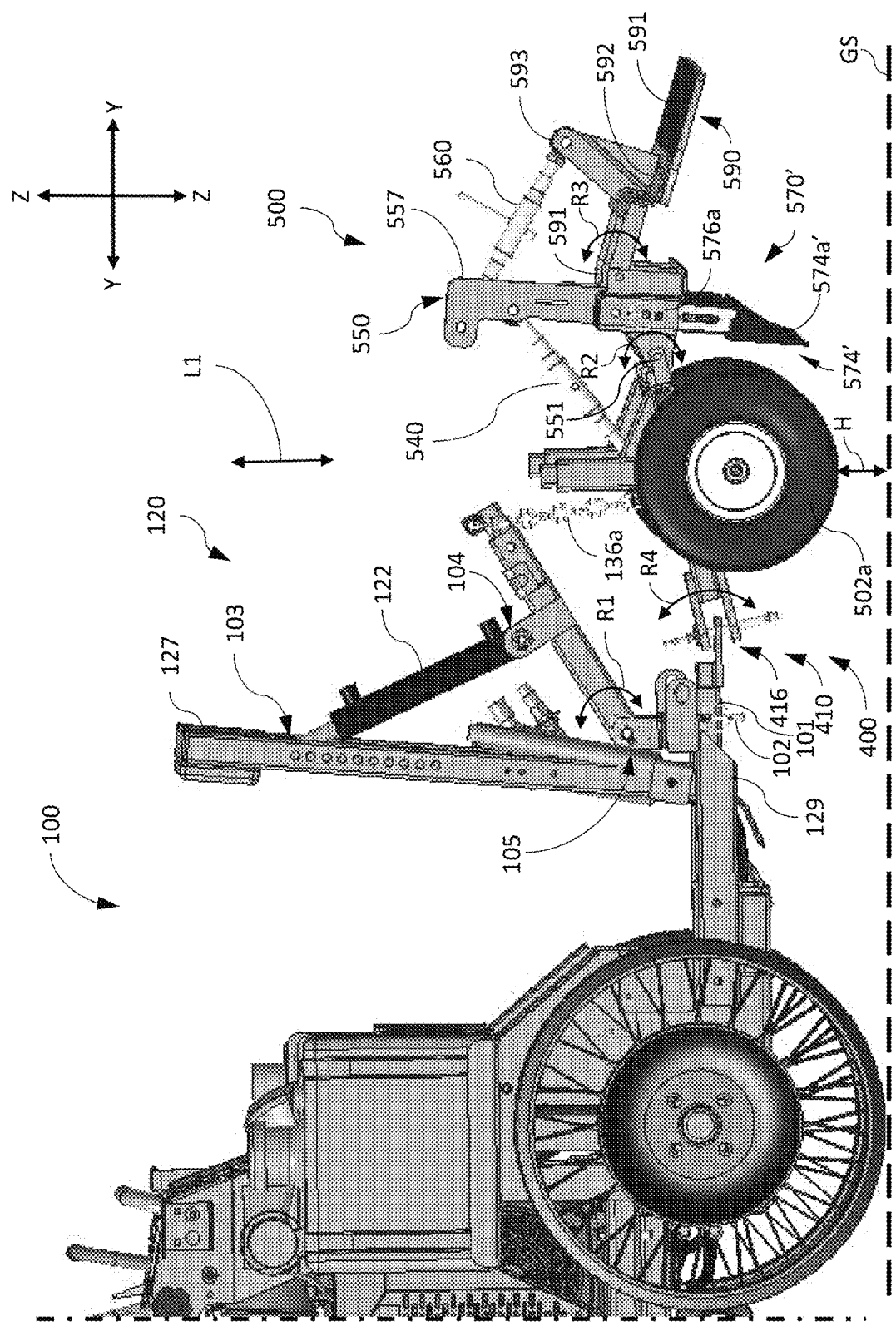
FIG. 10A is a side view of a portion of an example system comprising a rear hitch coupled with a work machine and a ground working tool in a first state of an adjustment.
Figure 10B:
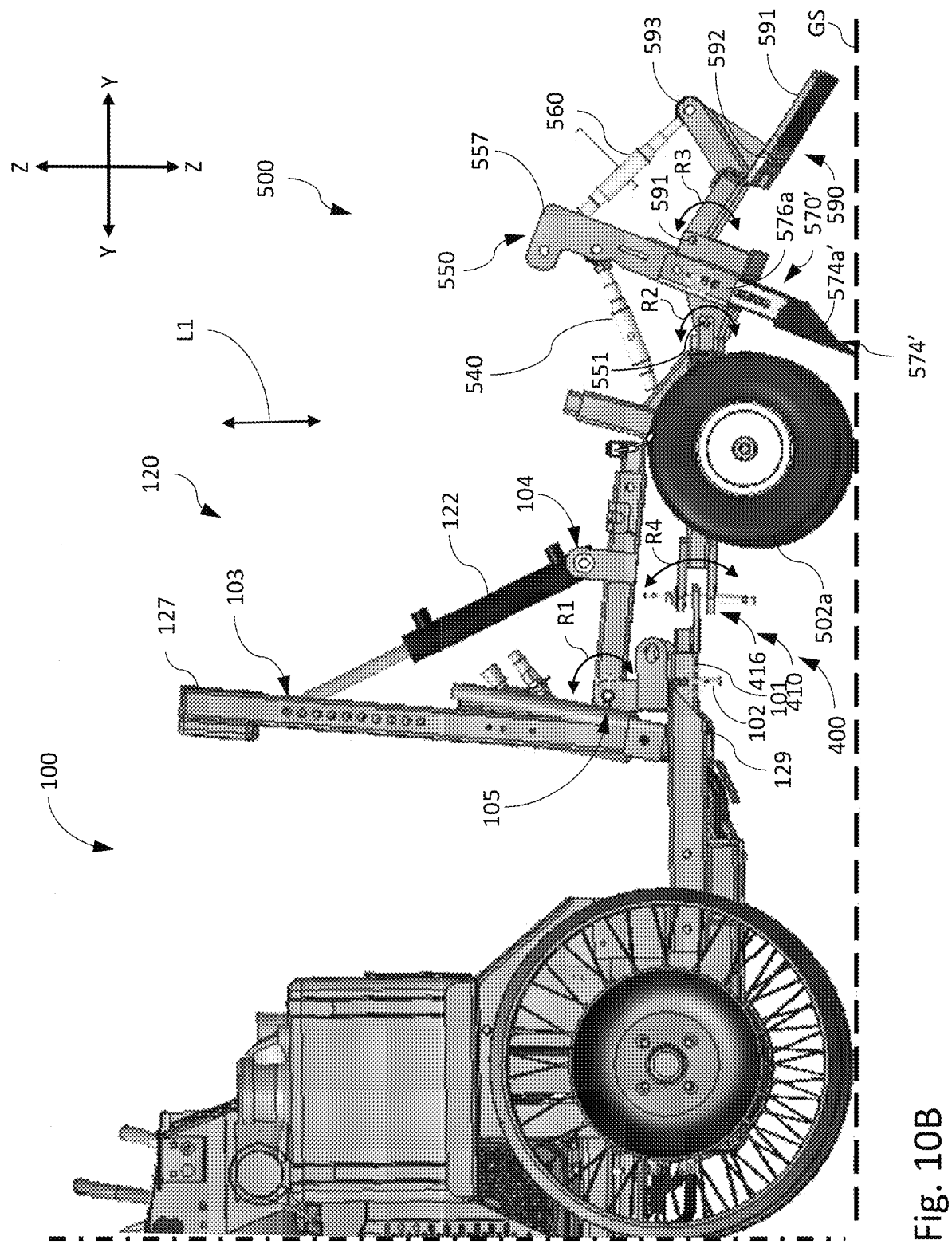
FIG. 10B is a side view of a portion of the system of FIG. 10A in a second state of an adjustment.
Figure 10C:
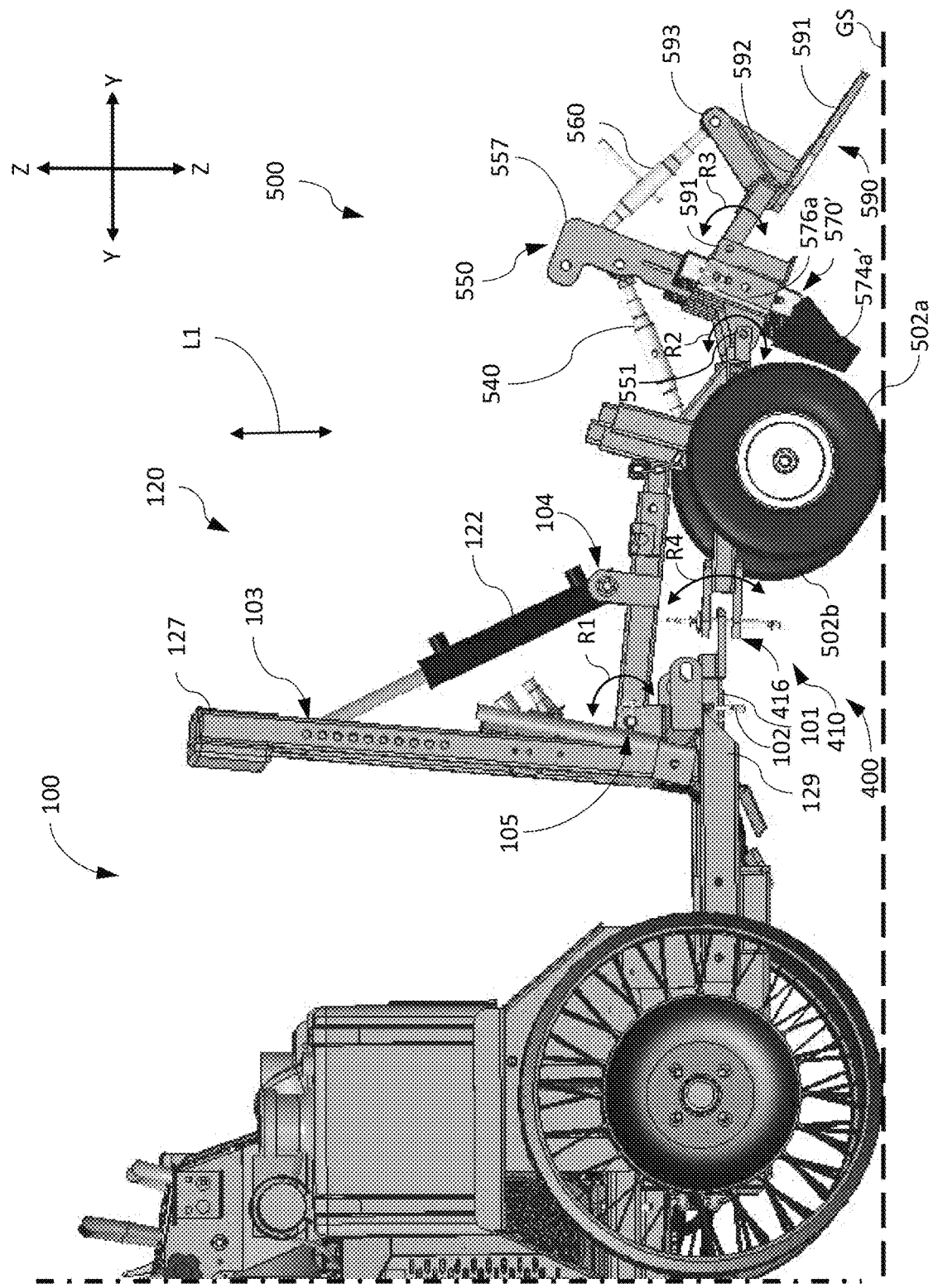
FIG. 10C is a side view of a portion of the system of FIG. 10C in a third state of an adjustment.
Figure 11:
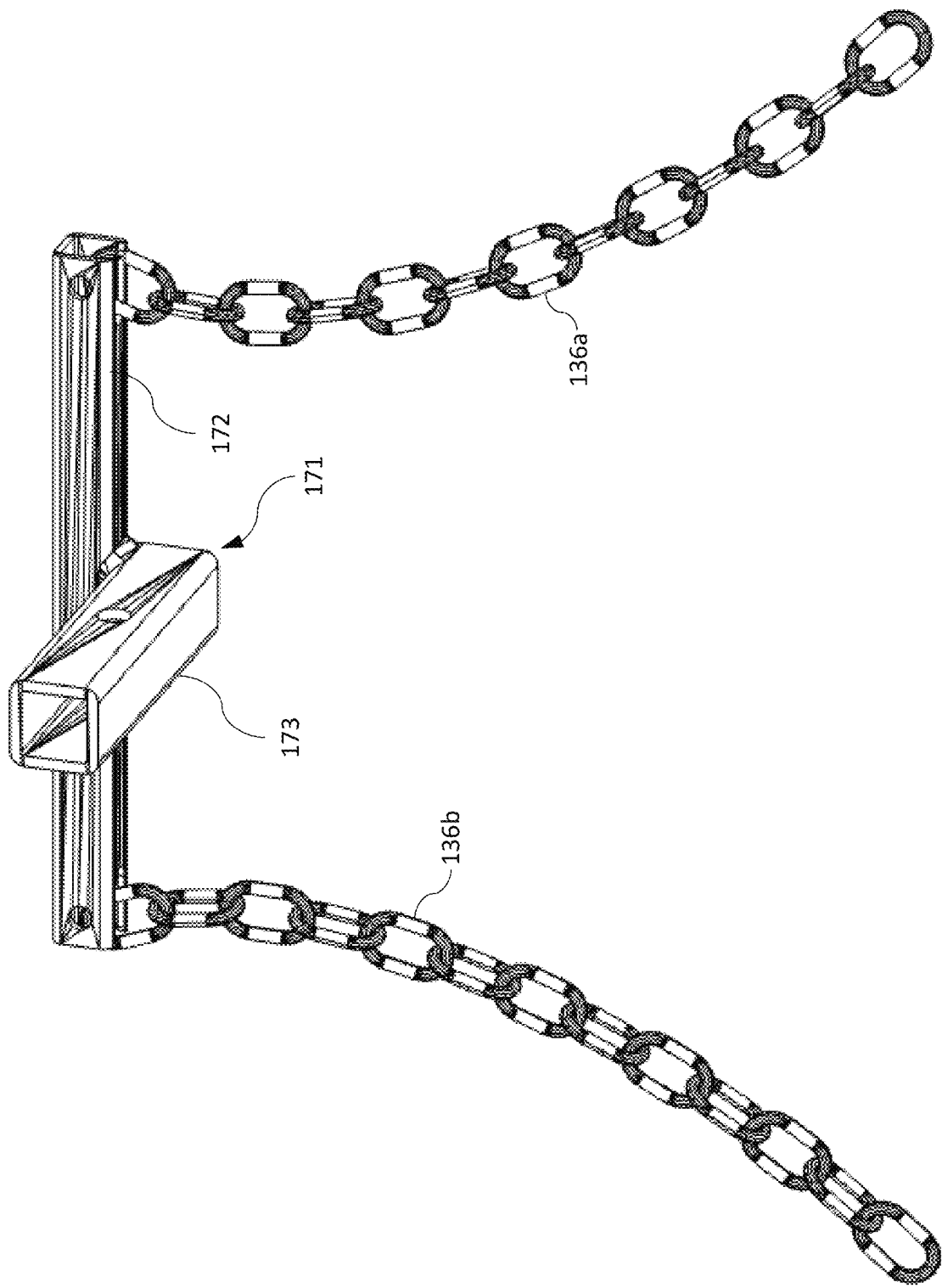
FIG. 11 is a perspective view of a portion of the system of FIG. 1.

With reference to FIGS. 10A-10C, there is illustrated another example embodiment comprising a rear hitch system 400 coupling a work machine 100 with a ground working tool 500. The embodiment of FIGS. 10A-10C includes a number of elements that are the same as those described hereinabove in connection with the embodiment illustrated and described in connection with FIGS. 1-9B which are denoted with the same reference numeral utilized in the illustration and description thereof. The embodiment of FIGS. 10A-10C also differs from the embodiment of FIGS. 1-9B in certain respects. For example, in the embodiment of FIGS. 10A-10C the tool 500 comprises a ground engaging tool assembly 570' operatively coupled with a tool subframe assembly 550. The ground engaging tool assembly 570' includes a plurality of scarifying shanks 574' which are received in and retained by respective receivers 576a which are, in turn, coupled with a lateral member 520 which is coupled with the frame 505 by a plurality of hinges 551 and rotatable relative to the frame 505 in the direction generally indicated by arrow R2. A top link 540 is coupled with and extends between the frame 505 and a post member 557 of the tool subframe assembly 550. The top link 540 is operator adjustable to vary its length effective to rotate the tool subframe assembly 550 and the ground engaging tool assembly 570 about an axis of the hinges 551 in the direction generally indicated by arrow R2.

FIG. 10A illustrates the lifting member 114 rotated to a raised position in which the tool 500 is raised above the underlying ground surface GS by a distance H and supported in this position by flexible riggings 136a, 136b which are maintained in a taut state. FIG. 10B illustrates the lifting member 114 rotated to a lowered position in which the tool 500 is lowered into contact with the underlying ground surface GS and the plurality of scarifying shanks 574' are adjusted to a working height to penetrate into the underlying ground surface GS. FIG. 10C illustrates the lifting member 114 rotated to a lowered position in which the tool 500 is lowered into contact with the underlying ground surface GS and the plurality of scarifying shanks 574' are adjusted to a non-working position raised above the underlying ground surface GS. The height of the scarifying shanks is independently adjustable in addition to the other adjustability of the tool 500.

While exemplary embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred, or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An apparatus comprising a hitch for coupling a ground working tool with a work machine, the hitch including:

a first elongate member configured to couple with a work machine at a rearward location of the work machine, a second elongate member configured to couple with the ground working tool, and a play-added clevis joint coupling the first elongate member and the second elongate member, the play-added clevis joint comprising a clevis including a first clevis member including a first eye and a second clevis member including a second eye, a tang member including an oblong-shaped third eye, and a pin passing through the first eye, the second eye, and the oblong-shaped third eye, the clevis and the tang member being rotatable relative to one another about a Z-axis of the pin, and the clevis being tiltable relative to the tang member in a Y-Z plane extending along a centerline of the oblong-shaped third eye;

wherein the play-added clevis joint comprises a seating member positioned intermediate the first clevis member and the second clevis member and having a seating face facing the tang member, a first planar surface of the seating face contacting a second planar surface of the tang member with the tang member positioned intermediate the first elongate member and the second elongate member to align the first elongate member and the second elongate member when the clevis is tilted to a predetermined degree relative to the tang member in the Y-Z plane.

2. The apparatus of claim 1 comprising the ground working tool.

3. The apparatus of claim 2 wherein the ground working tool comprises:

a frame, first and second ground contacting members rotatably coupled with the frame at spaced apart locations, a first ground engaging member adjustably coupled with the frame, and a first adjustment mechanism coupled with the frame and the first ground engaging member.

4. The apparatus of claim 3 wherein the first ground engaging member comprises at least one shank member coupled with the frame by a tool subframe assembly and the first adjustment mechanism is adjustable to vary a pitch of the at least one shank member relative to the frame.

5. The apparatus of claim 4 wherein the at least one shank member comprises one of a shank-mounted cleaving blade and a scarifying shank.

6. The apparatus of claim 4 comprising:

a second ground engaging member adjustably coupled with the tool subframe assembly; and a second adjustment mechanism coupled with the tool subframe assembly and the second ground engaging member.

7. The apparatus of claim 6 wherein the first adjustment mechanism and the second adjustment mechanism are independently variable.

8. The apparatus of claim 6 wherein the second ground engaging member comprises a rake rotatably coupled with the tool subframe assembly and the second adjustment mechanism is adjustable to vary a pitch of the rake relative to the tool subframe assembly.

9. The apparatus of claim 8 wherein the first adjustment mechanism and the second adjustment mechanism are independently variable.

10. The apparatus of claim 1 wherein the seating face is substantially planar.

11. The apparatus of claim 1 comprising a lifting member coupled with the hitch by a flexible rigging, the lifting member being adjustable by an operator to raise and lower the lifting member effective to tilt the pin and the clevis relative to the tang member in the Y-Z plane extending along the centerline of the oblong-shaped third eye.

* * * * *